Feb. 6, 1940.  F. RICHARD  2,188,921
PROCESS OF MAKING REFRACTORIES
Filed Feb. 17, 1936

INVENTOR.
François Richard
BY
Bay, Oberlin & Bay
ATTORNEYS.

Patented Feb. 6, 1940

2,188,921

UNITED STATES PATENT OFFICE 2,188,921

PROCESS OF MAKING REFRACTORIES

François Richard, Cleveland, Ohio

Application February 17, 1936, Serial No. 64,204

14 Claims. (Cl. 25—156)

In the production of refractory bricks and the like from magnesian materials, it is a customary practice to crush the rock and flux ingredients, mix the crushed material into a slurry with water, and fire to a clinker, and then crush the clinker, mold into bricks, and fire the bricks. Such bricks, while refractory, are lacking in a desirable high standard of crushing resistance and breaking strength, and are also subject to more or less spalling and shrinkage. I have found that the deficiencies commonly encountered are due to insufficient and incomplete reaction in the preparation, the properties of the material not being developed. In accordance with the present invention however, it now becomes possible to attain products of high breaking strength and crushing resistance, and with closely controlled properties otherwise.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

Figure 1:
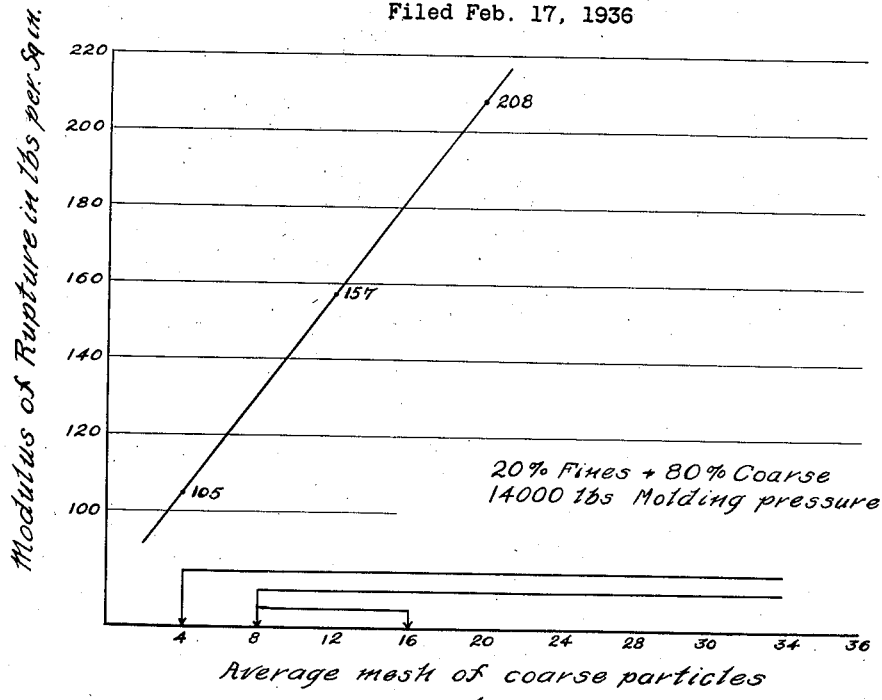
Figure 2:
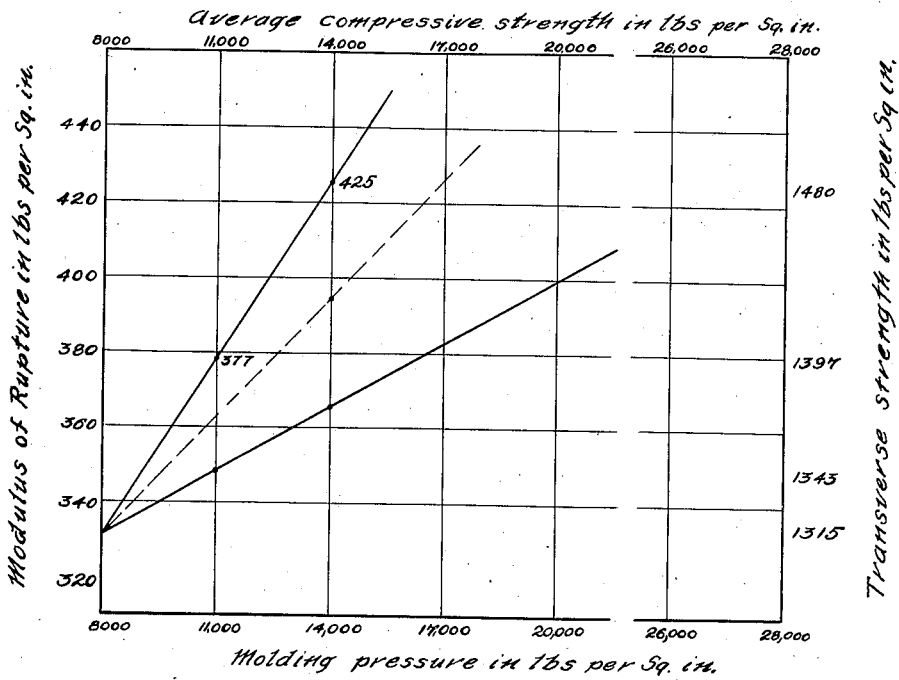

In said annexed drawing:

Figs. 1 and 2 are graphs, illustrating the bearing of certain factors with reference to product results.

Employing a refractory material possessing fundamental refractory properties, such as of magnesian character, dolomite, magnesian limestone, magnesites, etc., for instance, the raw material is finely pulverized. Fineness of division is of importance, particularly where dolomite with reactive materials is concerned, as facilitating speed and completeness of reaction in burning, and while the degree of fineness may vary, it is desirable that the crushed material be of for instance not less than about 50 mesh to minus 100 mesh, and the finer it is, the better the result, for instance preferably down to a range of 100 to minus 200 mesh. With the finely divided material there is incorporated a small amount of hydrateable refractory material or any other hydrateable material for use as a binder, such as crushed clinkered or calcined dolomite, magnesite, calcium oxide, Portland cement, etc., for instance five to twenty-five per cent. The material is in turn mixed with water to a moldable mass and pressed into bricks or other shape, and allowed to stand or cure or thoroughly hydrate, for instance two days up to four or five days, and then burned. Or as a slurry, which should also be allowed to cure, may be burned in a rotary kiln to a clinker or a dead burn. Or in general when a refractory material in natural stage does not possess all the refractory characteristics, and does not have the greatest strength which is required to obtain a high quality refractory product, it is necessary to add a percentage of refractory ingredients which do possess the desired refractory characteristics and which will give the greatest strength to obtain a high quality refractory product. To attain these objectives, it is necessary to pulverize the fundamental natural refractory material to a predetermined screen mesh. Also, to pulverize to the same screen mesh, the supplementary refractory materials which are to be added, and thoroughly mix these supplementary refractory materials with the fundamental refractory material, while in the dry stage. And then, form a plastic mass by adding water, also adding a small percentage of binding refractory material having a hydrateable property; or any hydrateable material suitable to retain an imparted form and then form under hydraulic pressure or any other pressure. The pressure causes the materials to take form according to the molds used, as, stone, brick, or any other form of product. When the hydration and chemical action have taken effect and the product is hard enough and has sufficient strength to be handled, the product is burned to a predeterminated temperature in a kiln, to the stage of dead burned material. The material coming out of the kiln is a compound, of which through this process, I have perfect control. It is noticed that some of the hydrateable materials above mentioned may even be such as to conduce to dicalcium silicate, reactable silica being incidentally present, but this is immaterial in this stage of preparation, and in the final stage of manufacture detailed below the products as prepared from suitable materials are wholly stable.

The burned shapes or clinkers are now crushed, very finely, and screened into fines ranging from 100 to minus 200 to 300 mesh and the finer the better, for use as a cementing binder, and coarser particles ranging from 8 to minus 100 mesh for use as an aggregate. The material is desirably in a completely or dead burned condition. This crushed and screen-separated material is now re-proportioned, and very accurate control may thus be obtained. While the material may be all crushed to fines and be thus employed, generally the fines used as a binder are employed in proportions of for instance 10–90 per cent, and the coarser particles used as an aggregate in amounts corresponding. By admixture of water in suitable amount, the material is brought to a plastic or moldable condition, about 15 to about 50 per cent of water for instance or as required, being employed, and the plastic is molded into bricks or any shape desired by suitably high pressure, mechanical or hydraulic. The water should be in general ample to assuredly fill interstitial voids and eliminate air, and provide hydration. The amount of pressure is of importance, and should be at least 10,000 pounds per square inch, and better 14,000, and preferably 28,000 pounds or more. The formed bricks or shapes are then set to cure at ordinary temperatures, so as to allow hydration, as for instance two days to several days. When sufficiently firm to be handled, the bricks or shapes are desirably wet with water, such being suitably applied to effect complete hydration of the binder. The bricks or shapes may in fact be immersed in water for several hours, for instance one to twelve or more depending upon the volume and shape of the piece and be conveyed back for curing in a stock room for a period of time insuring full hydration, for instance 30 days to 6 months or more depending upon size or volume, etc. This curing at ordinary temperature in the presence of sufficient water brings about an ultimate completeness of stability not heretofore realized with such materials. The product is now ready for use in laying up linings of kilns, ovens, blast furnaces, steel furnaces, etc. It is set in its desired position green, no burning preliminary thereto being required.

As illustrating more detailedly the effect of fine grinding and controlled proportioning in accordance with the present invention, where the re-proportioned crushed material was combined in amounts of 20 per cent hydrateable binding fines, and 80 percent coarser particles as aggregate from minus 100 mesh to 4 mesh, and the material being pressed into bricks at 14,000 pounds per square inch, on test the brick had a modulus of rupture of 105 pounds per square inch. If the crushed material re-proportioned likewise that the coarser particles ranging from 16 mesh to 8 mesh, was similarly molded under 14,000 pounds per square inch, the brick had a modulus of rupture of 157 pounds per square inch. But with a similar mixture the coarser particles ranging from minus 100 mesh up to 8 mesh, the bricks being similarly molded under 14,000 pounds per square inch, the brick had a modulus of rupture of 208 pounds. As illustrated in Fig. 1, the strength goes up surprisingly rapidly with finer grinding and the finer the material can be ground, the stronger the finished product. It thus is possible to closely control the properties as desired. Fineness of material I have found to conduce to the completeness of reaction to monolithic condition, and by impalpably fine preparation and by ample hydration of the calcined magnesic base there is no longer a mere superficial action at the contacting surfaces of particles as heretofore, but instead a through and through reaction to homogeneity, with an abruptly different result in product strength in contrast to that customary. Natural impurities in the rock can thus be directed to completeness of stable interaction, including even silica, instead of being left in a state to change further and further when under duty in a furnace wall. Again, as to the importance of the factor high pressure, for example taking the crushed material and screening the fines of 100 mesh to minus 300 mesh as a hydrateable binder, and coarser particles of 8 mesh to minus 100 mesh as an aggregate, and combining in proportion of 40 per cent of the fines to 60 per cent of such coarser particles, and molding into bricks under compared pressure and burning partially, 950° C. for ten hours, cooling and testing for modulus of rupture strength, the brick molded at 11,000 pounds pressure had a modulus of rupture of 377 pounds per square inch. Such brick tested in wholly green state however for transverse strength showed 1395 pounds per square inch and for compression strength showed 11,000 pounds per square inch. Again, the same ingredients in the same proportion and treated in the same way, but molded into brick at 14,000 pounds per square inch, on being tested for modulus of rupture strength showed a modulus of rupture of 425 pounds per square inch, and tested green for transverse strength showed 1425 pounds per square inch and for compression strength showed 14,000 pounds per square inch, and by increasing the molding pressure to 28,000 pounds per square inch, the mean for the traverse strength amounts to 1700 pounds per square inch, and the modulus of rupture 545 pounds per square inch, and the compressive strength a little over 28,000 pounds per square inch. It is noteworthy that high pressure improves the load-carrying ability for high temperatures. As illustrated in the graph, Fig. 2, the strength of product runs up surprisingly rapidly with increase of molding pressure, and the higher the molding pressure the greater the strength of product.

Employing crushed material as described, I may also when desired combine refractory ingredients such as alumina, chromites, crystallized silicon carbide, magnesia, zirconia, etc., these, in coarser particle form as noted and in proportion as desired for the refractory, the fines as described constituting the binding means for the whole. Thus, any specific type of high duty refractory products can be proportioned as preferred, and particularly desirable combinations of refractory materials may be produced.

Shrinkage and spalling have been matters of particular difficulty in the art heretofore. The ideal refractory would have no expansion and contraction from heat and cold. As a further refinement of my invention, I may control the expansion and contraction co-efficient by the proportion of the fines or refractory binder ingredient, and by the size of particles used, and by the pressure used in forming the product. For instance, where employing dolomite clinker as above described nad molding the product at 35,000-40,000 pounds pressure, such difficulty is practically negligible. Higher molding pressure, as 50,000 pounds, still further reduces dolomite shrinkage tendency. Where desired, by another way of approach I may attain products free from objectionable coefficients of expansion and contraction by compensating for slight contraction tendency of one ingredient by including an ingredient having a slight heat expansion tendency. For example, "alundum" or alumina and crystallized silicon carbide having positive coefficients of expansion may be combined with dolomite and opposing tendencies be cancelled, and this moreover without substantial internal stress where the materials are suitably finely divided and high pressure molded. And preferably, the refractory ingredients are dead burned to a temperature of about 200° C. above the temperature intended to be used with the finished refractory product. Air, being compressible, if trapped in voids between particles, and compressed in the finished product, will, in the burning, cause porosity and sometimes dilatation of the product. By use of water in amount as afore-described, to full saturation, air however is eliminated in the present process, and water not being compressible, will, in the high molding pressure allow of clearance of void-spaces, with the formation of a product which is closely homogeneous. Products in accordance with the present invention are in fact of much greater density and higher specific gravity than products heretofore. In addition to the control of expansion and contraction in the finished product by proportioning of the dead burned refractory ingredient particle sizes and the amount of pressure applied in the forming, the compression strength and shear resistance may be closely controlled by the factors of the fineness of the refractory particles and the amount of pressure employed in molding.

Other modes of applying the principle of the invention may be employed, change being made as regards the details described, provided the features stated in any of the following claims, or the equivalent of such, be employed.

I therefore particularly point out and distinctly claim as my invention:

1. A process of making refractories, which comprises crushing magnesian rock, incorporating water, burning, crushing the burned product, screening into fines and coarser particles, re-proportioning the fines and coarser particles, incorporating water, pressing into shapes under a pressure of at least 10,000 pounds per square inch, and curing the shapes in the presence of water.

2. A process of making refractories, which comprises crushing magnesian rock, incorporating water, burning, crushing and burned product, screening into fines of 100 to less than 200 mesh and coarser particles of 8 to less than 100 mesh, re-proportioning the fines in amount of 10–90 per cent with the coarser particles, incorporating water, pressing into shapes under a pressure of at least 10,000 pounds per square inch, and curing the shapes in the presence of water.

3. A process of making refractories, which comprises crushing magnesium rock, incorporating with such raw material a lesser proportion of more finely divided hydrateable binder and water, burning, crushing the burned product, screening into fines of 100 to less than 200 mesh and coarser particles of 8 to less than 100 mesh, mixing such fines with a larger amount of the coarser particles, incorporating water, pressing into shapes under at least 14,000 pounds pressure per square inch, and curing the pressed shapes at ordinary temperatures in the presence of water.

4. A process of making refractories, which comprises crushing refractory material to 50 mesh to minus 100 mesh, adding water, hydrating, burning, crushing the burned material, re-proportioning in finely powdered and coarser particles, adding water, pressing into form, and curing.

5. A process of making refractories, which comprises mixing finely powdered hydrateable refractory material with coarser refractory particles not exceeding four mesh, adding water, hydrating, burning, crushing the burned material, re-proportioning in finely powdered and coarser particles, adding water, pressing into form, applying water to the formed product, and curing.

6. A process of making refractories, which comprises mixing finely powdered calcined magnesium-containing refractory material with coarser refractory particles, adding water, pressing into form under at least 28,000 pounds per square inch, and hydrating in the presence of water.

7. The method as set forth in claim 1 wherein the second incorporation of water is in a quantity sufficient to fill the interstitial voids of the refractory mixture.

8. The method as set forth in claim 5 in which the second addition of water is in quantity sufficient to fill the interstitial voids of the refractory mixture.

9. A process of making refractories, which comprises crushing magnesian rock, incorporating water, burning, crushing the burned product, screening into fines and coarser particles, reproportioning the fines and coarser particles, supplying a substance having a compensating expansion tendency relative to the said magnesian rock, incorporating water with the said mixture in quantity sufficient to fill the interstitial voids, pressing into forms under predetermined high pressures, and curing the resultant forms.

10. A process of making refractories which comprises crushing a refactory material, incorporating water, burning, crushing the burnt product, screening into fines and coarser particles, reproportioning the fines and coarser particles, supplying a substance having a compensating coefficient of expansion relative to the said refractory material, incorporating water with said mixture in quantity sufficient to fill the interstitial voids, pressing into forms under predetermined high pressures, and curing the resultant forms.

11. A process of making refractories, which comprises mixing with magnesium-containing hydrateable refractory particles of not over four mesh size, a minor proportion of magnesium-containing hydrateable refactory material in a more finely powdered condition, adding water, pressing into form, and curing by maintaining in the presence of water.

12. A process of making refractories, which comprises mixing finely powdered magnesium-containing hydrateable refractory material with coarser particles of magnesium-containing refractory material, adding water, pressing into form under at least 14,000 pounds per square inch, and curing in the presence of water.

13. A process of making refractories, which comprises mixing finely divided hydrateable magnesium-containing refractory material with coarser magnesium-containing refractory particles not exceeding four mesh, removing air by supplying through the mass water sufficient to fill the voids, introducing the wetted mass into a pressing zone and pressing into form under heavy pressure, allowing the formed articles to set at ordinary temperatures, applying moisture, and further allowing to set.

14. A process of making refractories, which comprises mixing finely divided hydrateable magnesium-containing refractory material with coarser magnesium-containing refractory particles not exceeding four mesh, removing air by supplying through the mass water sufficient to fill the voids, introducing the wetted mass into a pressing zone and pressing into form under at least 14,000 pounds per square inch, allowing the formed articles to set at ordinary temperatures, supplying additional moisture, and further allowing to set.

FRANÇOIS RICHARD.